United States Patent
Fujii et al.

(10) Patent No.: US 7,130,277 B2
(45) Date of Patent: Oct. 31, 2006

(54) COMMUNICATION SYSTEM AND COMMUNICATION METHOD

(75) Inventors: Teruko Fujii, Tokyo (JP); Yoshimasa Baba, Tokyo (JP); Yasuyuki Nagashima, Tokyo (JP); Masataka Kato, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1053 days.

(21) Appl. No.: 10/168,728

(22) PCT Filed: Jun. 22, 2001

(86) PCT No.: PCT/JP01/05355

§ 371 (c)(1),
(2), (4) Date: Jun. 24, 2002

(87) PCT Pub. No.: WO02/45351

PCT Pub. Date: Jun. 6, 2002

(65) Prior Publication Data

US 2002/0191540 A1 Dec. 19, 2002

(30) Foreign Application Priority Data

Nov. 29, 2000 (JP) .............................. 2000-363722

(51) Int. Cl.
*H04J 1/16* (2006.01)
*H04J 3/24* (2006.01)
(52) U.S. Cl. ..................................... 370/252; 370/474
(58) Field of Classification Search .................... None
See application file for complete search history.

(56) References Cited

U.S. PATENT DOCUMENTS

| 5,802,068 A * | 9/1998 | Kudo .......................... 370/538 |
| 6,317,462 B1 * | 11/2001 | Boyce ................... 375/240.27 |
| 6,444,582 B1 * | 9/2002 | Tsai ............................ 438/691 |
| 6,757,299 B1 * | 6/2004 | Verma ......................... 370/482 |
| 6,904,089 B1 * | 6/2005 | Sueyoshi et al. ........... 375/240 |
| 7,006,503 B1 * | 2/2006 | Lee ............................. 370/470 |

FOREIGN PATENT DOCUMENTS

| EP | 942560 A2 | 9/1999 |
| JP | 1-284042 A | 11/1989 |
| JP | 5-153132 A | 6/1993 |
| JP | 9-116572 A | 5/1997 |
| JP | 10-65583 A | 3/1998 |
| JP | 2836603 B2 | 12/1998 |
| JP | 11-331222 A | 11/1999 |
| JP | 2000-183961 A | 6/2000 |

* cited by examiner

*Primary Examiner*—Andrew C. Lee
(74) *Attorney, Agent, or Firm*—Birch, Stewart, Kolasch & Birch, LLP

(57) ABSTRACT

Nodes (N1 to N3) include MTU length calculation sections (31 to 33) which multiply baud rates (D21 to D23) of communication parameters (D11 to D13) set based on results of negotiation with other nodes (N1 to N3) by a communication regulated time used in timer control for transmission/reception, and which calculate MTU lengths as maximum packet lengths of the packets based on the multiplication results so that transmission times of the packets for the destination nodes are equal to each other, and also include communication control sections (21 to 23) which divide data to be transmitted to destination nodes into packets having the calculated MTU length to transmit the packets.

14 Claims, 14 Drawing Sheets

US 7,130,277 B2

COMMUNICATION SYSTEM AND COMMUNICATION METHOD

TECHNICAL FIELD

The present invention relates to a communication system and a communication method for performing communication between nodes by using transmission media such as a power line in which communication qualities change depending on the connection positions or on the connection time zones of a plurality of nodes connected on the same transmission medium. More particularly, this invention relates to a communication system and a communication method capable of efficiently performing communication between nodes.

BACKGROUND ART

In recent years, in order to reduce costs or to effectively use existing equipment without establishing new communication equipment, a "power line modem" that can perform communications using an existing power line (also called an indoor wire) is attracting attention. This power line modem networks electric products which are arranged in or outside houses or in buildings, factories, shops, and the like, and which are connected through a power line, and thereby various processes such as control of these products, data communications, and the like can be performed.

As wire-based digital communication except for the digital communication obtained by networking electric products, i.e., as a network communication using a plurality of multiple-connected power line modems provided outside houses, internet communication using personal computers is known.

However, in the communication through the power line, transmission qualities between nodes connected to the power line are considerably different from each other depending on environments of electric products connected to the power line, although the nodes are connected to the same power line. The difference between the transmission qualities makes a large delay difference in data transmission even though data having equal data lengths is transmitted. Therefore, the respective nodes cannot perform communication in an optimum state, disadvantageously.

In particular, in order to realize high-speed communication, various communication parameters such as using frequency bands, transmission rates, and error correction methods of nodes on a power line must be optimally set.

For example, FIG. 13 is a diagram which shows the schematic configuration of the communication system using such a power line. In FIG. 13, this communication system has a plurality of nodes N1 to N3 connected to a power line W. Since a transmission quality in the power line W between the nodes N1 and N2 is deteriorated by a noise source NS such as an air conditioner, communication process sections 11 to 13 of the nodes N1 to N3 perform negotiations between the nodes N1 to N3 to optimally set communication parameters D11 to D13 such as the using frequency bands, transmission rates (baud rates D21 to D23), and error correction methods explained above. A communication control sections 21 communicates with another node by using the communication parameters D11 to D13 which are optimally set.

Since the transmission quality between the nodes N1 and N2 is deteriorated by the noise source NS, low-speed communication, i.e., a low baud rate is set. Since the transmission quality between the nodes N2 and N3 is not deteriorated, high-speed communication, i.e., a high baud rate is set.

Therefore, when packets having equal data lengths are transmitted, the power line between the nodes N1 and N2 and the power line between the nodes N2 and N3 are different from each other in transmission time. More specifically, as shown in FIG. 14, when a packet PK10 having a data length LE10 are transmitted from the node N1 to the node N2, a time t12 is required. However, the packet PK10 is transmitted from the node N2 to the node N3, the packet PK10 is transmitted in a time t11 which is shorter than the time t12.

As a result, data transmission between the nodes N1 and N2 occupies the power line W for a time longer than a time for which data transmission between the nodes N2 and N3 occupies the power line W. Low-speed inter-node communication having poor transmission quality hinders high-speed inter-node communication. In an extreme state, the high-speed inter-node communication may be prevented from being performed.

Since the power line W is occupied by the low-speed inter-node communication, data communication such as voice communication or motion image communication having time-critical properties is adversely affected. Therefore, proper communication corresponding to each type of data cannot be performed.

Furthermore, since transmission quality is deteriorated in low-speed inter-node communication, repeat request may occur frequently. In addition to the low-speed communication, quantity of data transmission also increases, and the power line W may be congested.

Therefore, it is an object of this invention to provide a communication system and a communication method for efficiently performing communications between nodes by using a transmission medium such as a power line that the communication qualities change depending on connection positions or on connection time zones of a plurality of nodes connected on the same transmission medium, and particularly for reliably securing communications having time-critical properties.

DISCLOSURE OF THE INVENTION

A communication system according to the present invention performs communications between nodes by using a transmission medium such that the communication qualities change depending on connection positions or on connection time zones of a plurality of nodes connected on the same transmission medium. Each of the nodes comprises a calculation unit which calculates maximum packet lengths of packets whose transmission times for destination nodes are equal to each other based on transmission rates of communication parameters that are set according to results of negotiation with other nodes. The node also comprises a transmission process unit which divides data to be transmitted to a destination node into packets having the maximum packet length that is calculated by the calculation unit for the destination node, and transmits the packets.

According to this invention, the calculation unit of each node calculates the maximum packet length of packets whose transmission times for destination nodes are equal to each other based on the transmission rate out of the communication parameters set according to results of negotiation with other nodes. The transmission process unit divides data to be transmitted to the destination node into packets having the maximum packet length that is calculated by the calculation unit for the destination node, and transmits the packets. Thus, occupation times of packet transmission on the transmission medium are always equal to each other.

In a communication system according to the next invention based on the above invention, the calculation unit calculates the maximum packet length based on a value such that a regulated time in which transmission times of packets for the destination nodes are equal to each other is multiplied by the transmission rate.

According to this invention, the calculation unit calculates the maximum packet length based on a value such that a regulated time in which transmission times of packets for destination nodes are equal to each other is multiplied by a transmission rate of communication parameters, so that transmission of the packets is always finished within the regulated time.

In a communication system according to a next invention based on the above invention, the calculation unit calculates a first maximum packet length based on a value such that a first regulated time in which transmission times of preferential packets for the destination nodes are equal to each other is multiplied by the transmission rate, and calculates a second maximum packet length based on a value such that a second regulated time in which transmission times of packets other than the preferential packets for the destination nodes are equal to each other is multiplied by the transmission rate. The transmission process unit divides data to be transmitted to the destination nodes into packets each having the first maximum packet length to transmit the packets when data is data of the preferential packets, and divides data to be transmitted to the destination nodes into packets each having the second maximum packet length when the data is data of packets other than the preferential packets, and transmits the packets.

According to this invention, the calculation unit calculates a first maximum packet length based on a value such that a first regulated time in which transmission times of preferential packets for the destination nodes are equal to each other is multiplied by the transmission rate, and calculates a second maximum packet length based on a value such that a second regulated time in which transmission times of other packets than the preferential packets for the destination nodes are equal to each other is multiplied by the transmission rate. The transmission process unit divides, when data to be transmitted to the destination nodes is data of the preferential packets, the data into packets each having the first maximum packet length to transmit the packets and divides, when the data to be transmitted to the destination nodes is data of other packets than the preferential packets, the data into packets each having the second maximum packet length to transmit the packets, so that the maximum packet length of the preferential packets is set to be longer than the maximum packet length of the packets other than the preferential packets.

In a communication system according to a next invention based on the above invention, the regulated time, the first regulated time, or the second regulated time is a maximum waiting time for loopback which is set in a timer for transmission/reception control and is a time from when a packet is transmitted to a destination to when an acknowledgement packet corresponding to the packet is received.

According to this invention, the regulated time, the first regulated time, or the second regulated time is a maximum waiting time for loopback which is set in the timer for transmission/reception control and is a time from when a packet is transmitted to a destination to when an acknowledgement packet corresponding to the packet is received, so that one transaction is reliably finished within the maximum waiting time.

In a communication system according to a next invention based on the above invention, the transmission process unit stops transmission of a packet to the destination node when the maximum packet length, the first maximum packet length, or the second maximum packet length is not larger than a predetermined length.

According to this invention, the transmission process unit stops transmission of the packet to the destination node when the maximum packet length, the first maximum packet length, or the second maximum packet length is not larger than a predetermined length.

In a communication system according to a next invention based on the above invention, when a relay process of a packet is performed, the transmission process unit stops relay transmission of the packet subjected to the relay process when the maximum packet length, the first maximum packet length, or the second maximum packet length is not larger than a predetermined length.

According to this invention, at the time of performing the relay process of a packet, the transmission process unit stops relay transmission of the packet subjected to the relay process when the maximum packet length, the first maximum packet length, or the second maximum packet length is not larger than a predetermined length.

A communication method for communication between nodes according to a next invention uses a transmission medium such that the communication qualities change depending on connection positions or connection time zones of a plurality of nodes connected on the same transmission medium. The communication method comprises a calculation step of calculating maximum packet lengths of packets so that transmission times of the packets between the nodes are equal to each other, for the nodes, based on a transmission rate out of communication parameters that are set according to results of negotiation with other nodes. The method also comprises a transmission process step of dividing data to be transmitted to a destination node into respective data based on the maximum packet length that is calculated in the calculation step and corresponds to the destination node, and transmitting the data.

According to this invention, based on a transmission rate of communication parameters set according to results of negotiation with other nodes, the maximum packet lengths of packets are calculated for each node in the calculation step so that transmission times of the packets between the nodes are equal to each other. Data to be transmitted to a destination node is divided into respective data in the transmission process step based on the maximum packet length that is calculated in the calculation step for the destination node, and the data is transmitted.

In a communication method according to a next invention based on the above invention, in the calculation step, the maximum packet length is calculated based on a value such that a regulated time in which transmission times of packets for the destination nodes are equal to each other is multiplied by the transmission rate.

According to this invention, the maximum packet length is calculated in the calculation step based on a value such that a regulated time in which transmission times of packets for destination nodes are equal to each other is multiplied by a transmission rate of communication parameters.

In a communication method according to a next invention based on the above invention, in the calculation step, a first maximum packet length is calculated based on a value such that a first regulated time in which transmission times of preferential packets for the destination nodes are equal to each other is multiplied by the transmission rate, and a second maximum packet length is calculated based on a value such that a second regulated time in which transmission times of other packets than the preferential packets for the destination nodes are equal to each other is multiplied by the transmission rate. In the transmission process step, when data to be transmitted to the destination nodes is data of the preferential packets, the data is divided into packets each having the first maximum packet length to transmit the packets, and the data is divided into packets each having the second maximum packet length when the data to be transmitted to the destination nodes is data of packets other than the preferential packets, and the packets are transmitted.

According to this invention, a first maximum packet length is calculated in the calculation step based on a value such that a first regulated time in which transmission times of preferential packets for the destination nodes are equal to each other is multiplied by the transmission rate, and a second maximum packet length is calculated based on a value such that a second regulated time in which transmission times of packets other than the preferential packets for the destination nodes are equal to each other is multiplied by the transmission rate. In the transmission process step, when data to be transmitted to the destination nodes is data of the preferential packets, the data is divided into packets each having the first maximum packet length to transmit the packets, and the data is divided into packets each having the second maximum packet length to transmit the packets when the data to be transmitted to the destination nodes is data of packets other than the preferential packets. That is, the maximum packet length of the preferential packets is set to be longer than the maximum packet length of the packets other than the preferential packets.

In a communication method according to a next invention based on the above invention, the regulated time, the first regulated time, or the second regulated time is a maximum waiting time for loopback which is set in a timer for transmission/reception control and is a time from when a packet is transmitted to a destination to when an acknowledgement packet corresponding to the packet is received.

According to this invention, the regulated time, the first regulated time, or the second regulated time is a maximum waiting time for loopback which is set in a timer for transmission/reception control and is a time from when a packet is transmitted to a destination to when an acknowledgement packet corresponding to the packet is received, and thereby one transaction is reliably finished within the maximum waiting time.

In a communication method according to a next invention based on the above invention, in the transmission process step, transmission of a packet to the destination node is stopped when the maximum packet length, the first maximum packet length, or the second maximum packet length is not larger than a predetermined length.

According to this invention, transmission of a packet to the destination node is stopped in the transmission process step when the maximum packet length, the first maximum packet length, or the second maximum packet length is not larger than a predetermined length.

In a communication method according to a next invention based on the above invention, at the time of performing a relay process of a packet in the transmission process step, relay transmission of the packet subjected to the relay process is stopped when the maximum packet length, the first maximum packet length, or the second maximum packet length is not larger than a predetermined length.

According to this invention, at the time of performing a relay process of a packet in the transmission process unit, relay transmission of the packet subjected to the relay process is stopped when the maximum packet length, the first maximum packet length, or the second maximum packet length is not larger than a predetermined length.

BEST MODE FOR CARRYING OUT THE INVENTION

Embodiments of the communication system and the communication method according to this invention will be explained below with reference to the accompanying drawings.

Figure 1:
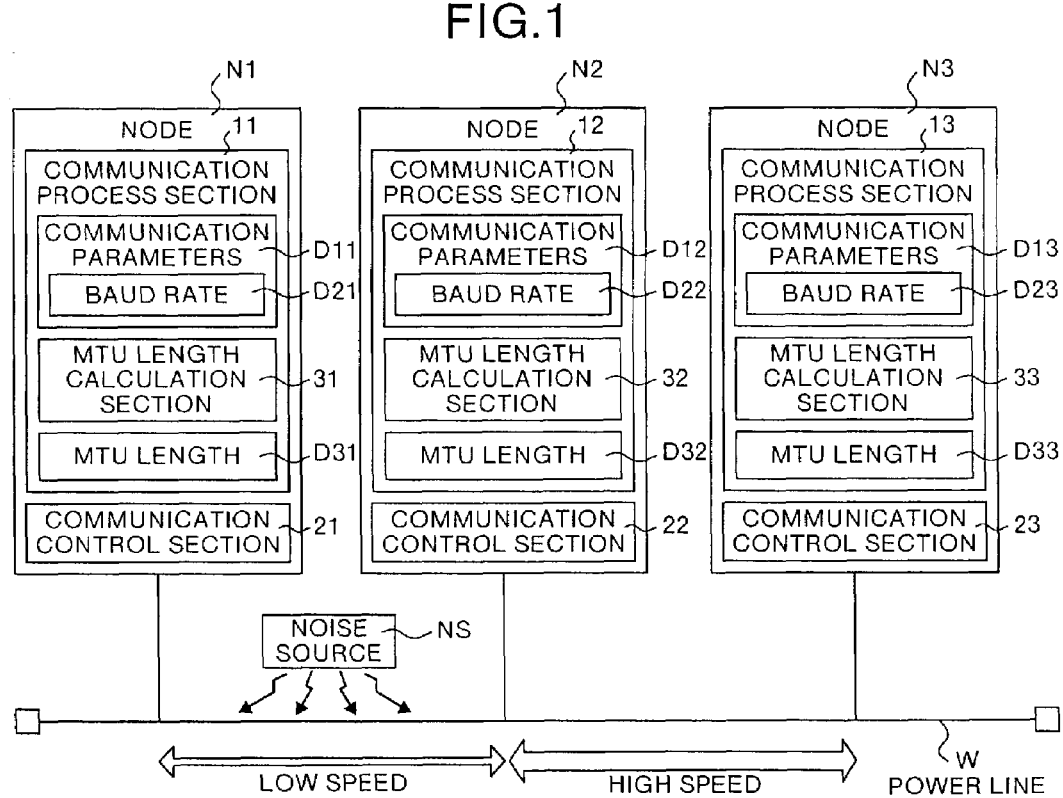
FIG. 1 is a diagram which shows a schematic configuration of a communication system according to a first embodiment of the present invention.
Figure 13:
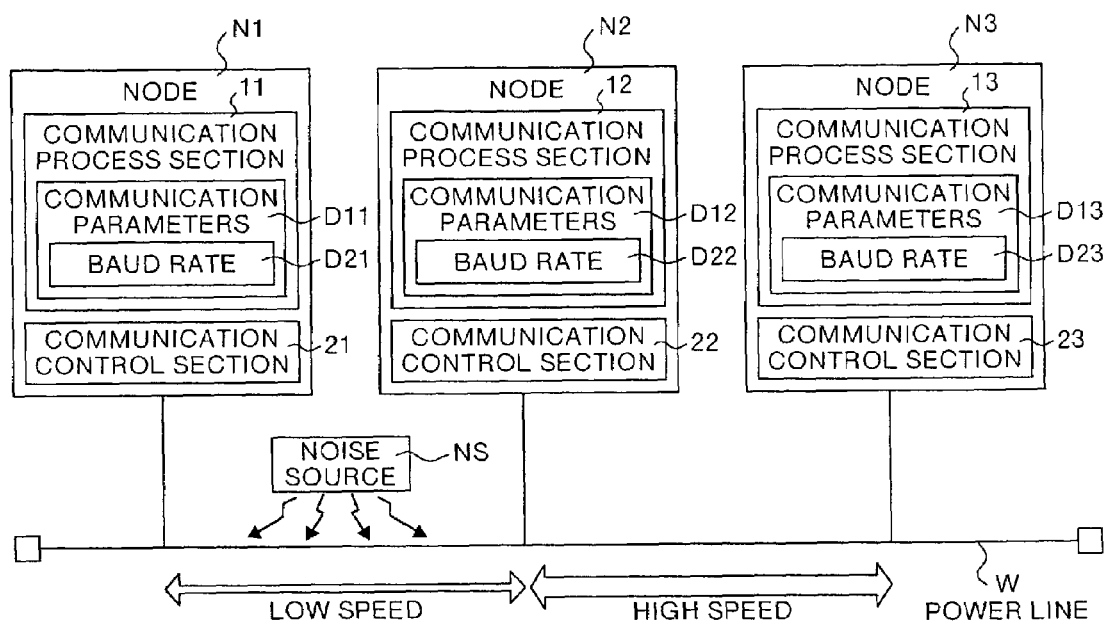
FIG. 13 is a diagram which shows a schematic configuration of a communication system in which the MTU lengths of packets transmitted and received between nodes are made constant.
Figure 14:
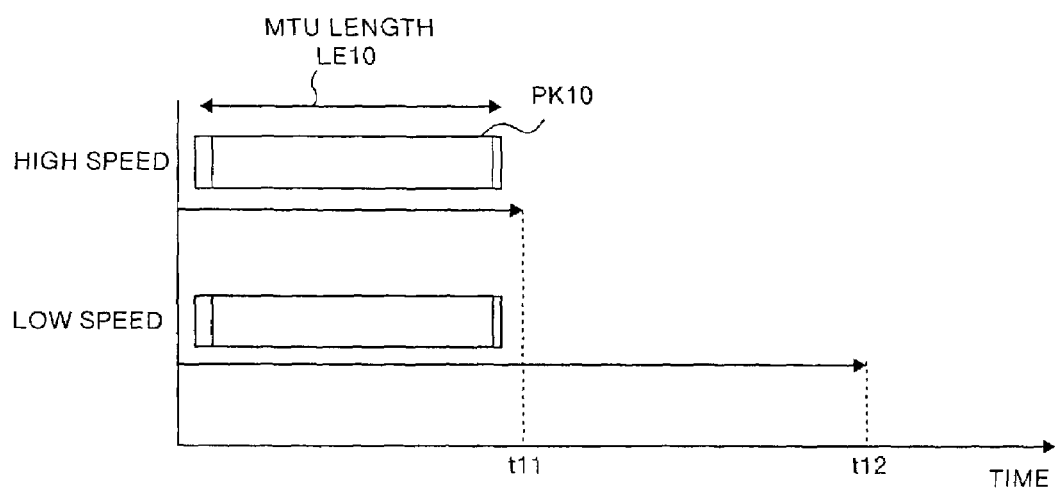
FIG. 14 is a diagram which shows a difference between transmission times in high-speed communication and low-speed communication in the communication system shown in FIG. 13.

First Embodiment:

A first embodiment of this invention will be explained below. FIG. 1 is a diagram which shows a schematic configuration of a communication system according to the first embodiment of the invention. In FIG. 1, this communication system has a plurality of nodes N1 to N3 connected to a power line W like the communication system shown in FIG. 13. The nodes N1 to N3 have communication process sections 11 to 13 and communication control sections 21 to 23, respectively.

The communication process sections 11 to 13 perform negotiations with the other nodes N1 to N3 to optimally set communication parameters D11 to D13 such as using frequency bands, transmission rates, and error correction methods. The communication control section 21 performs communicates with other nodes N1 to N3 by using the optimally set communication parameters D11 to D13. For example, transmission quality on the power line W between the nodes N1 and N2 is deteriorated by a noise source NS such as an air conditioner. When the nodes N1 and N2 communicate with each other, transmission rates (baud rates) D21 and D22 are set to be low to perform low-speed communication. On the other hand, when the nodes N2 and N3 communicate with each other, the baud rates D22 and D23 are set to be high.

The communication process sections 11 to 13 have MTU length calculation sections 31 to 33 each of which calculates MTU (Maximum Transmission Unit) lengths D31 to D33 of packets sent to the power line W so that transmission times on the power line W are equal to each other based on the settings of the baud rates. The MTU length is the maximum transmission unit length of a packet. Data having length longer than the MTU length is prohibited from being transmitted. The communication control sections 21 to 23 perform control for transmitting/receiving packets having the set MTU lengths D31 to D33.

Figure 2:
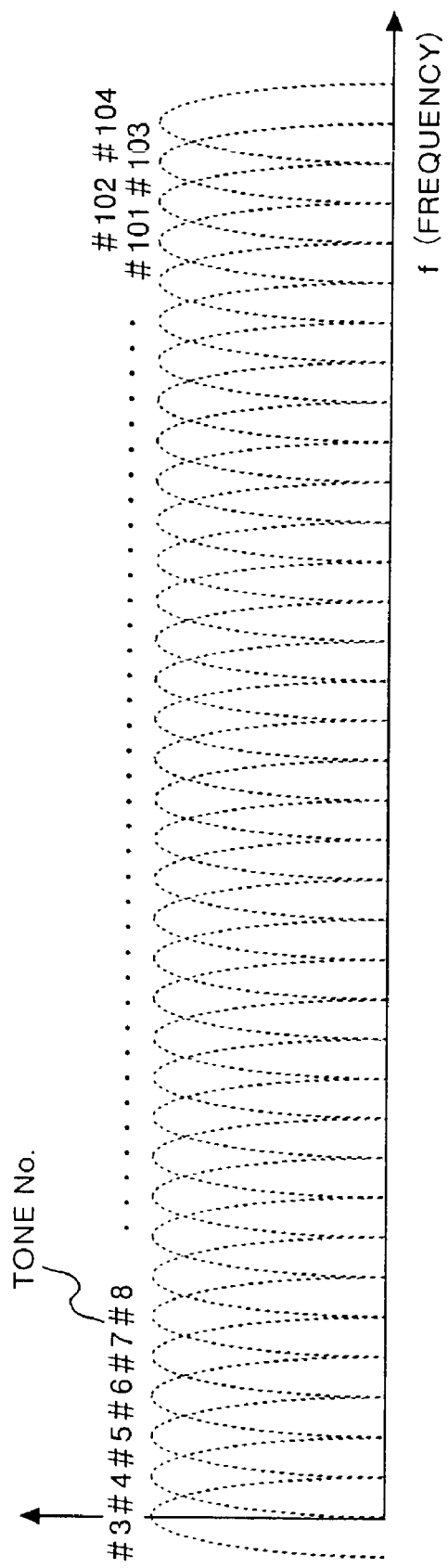
FIG. 2 is a diagram which shows a tone arrangement of an OFDM method used in the communication system shown in FIG. 1.

The outline of communication parameters will be explained below. Between the nodes N1 to N3, an OFDM (Orthogonal Frequency Division Multiplexing) signal is used, and, as shown in FIG. 2, 102 tones having tone #3 to tone #104 arranged at carrier intervals of ΔF=4.3125 kHz are used. These tones are used such that the tones are properly combined to each other according to transmission states, so that high-speed multicarrier transmission is realized. In particular, not only voice transmission or data transmission, but also data transmission of images or the like can be performed at a high speed.

Since the OFDM communication method is used in the negotiations between the nodes N1 to N3, communication parameters as follows are set between the nodes, such as not only a tone to be used but also a transmission rate, an equalizer coefficient for adjusting the amplitude and phase of a signal, a change of redundancy of an error correction method, and power control. For example, between nodes in a transmission path with high noise, a tone which avoids the noise is selected, or an error correction code having a high degree of redundancy is selected. More specifically, between nodes with much noise, a small number of tones are selected, and a baud rate to be set becomes low as the result. Such parameters are different from each other between different nodes, and are properly changed by a dynamic change in communication state.

Figure 3:
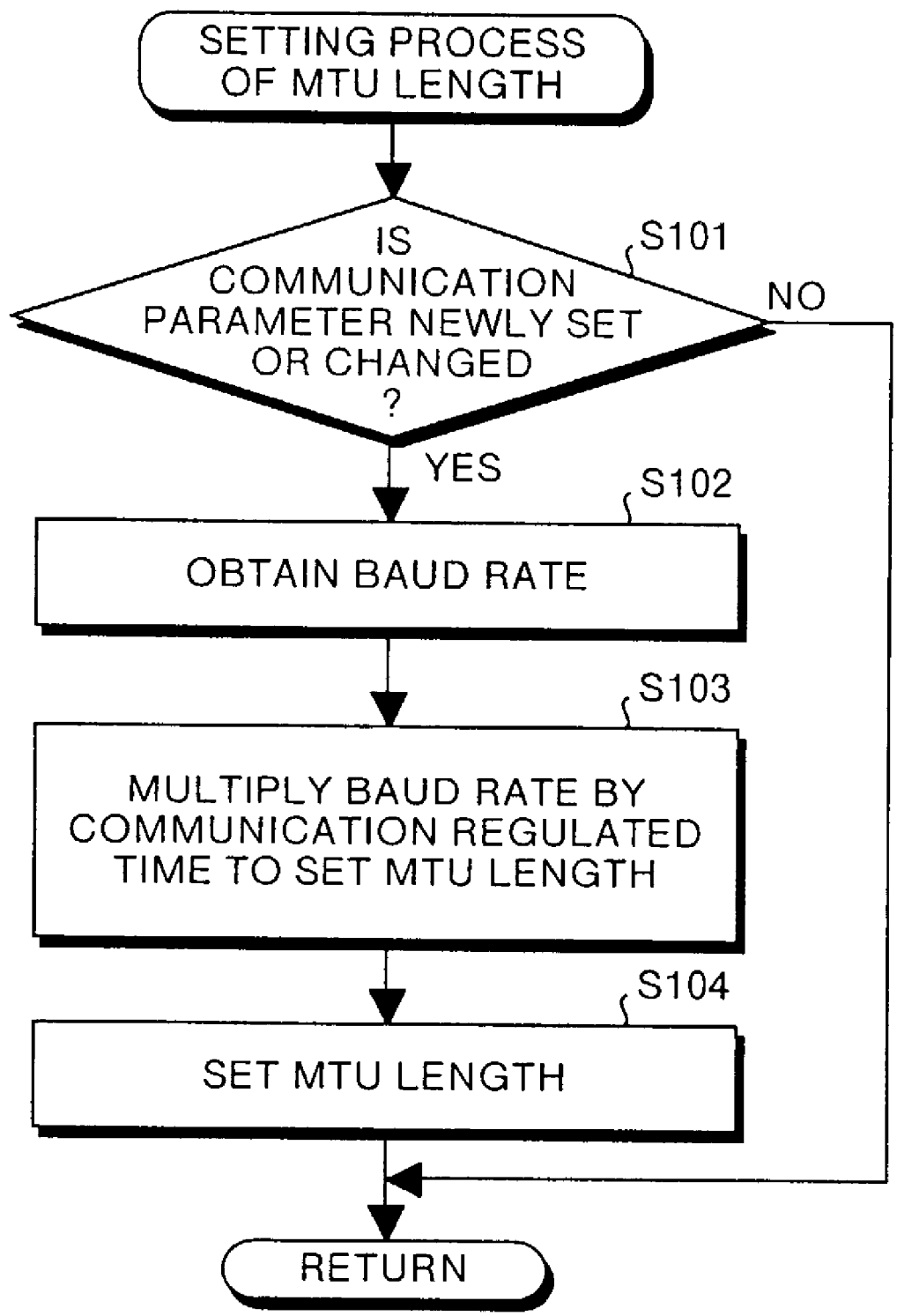
FIG. 3 is a flow chart which shows how the communication process unit shown in FIG. 1 sets an MTU length.

How the communication process sections 11 to 13 set the MTU lengths will be explained below with reference to the flow chart shown in FIG. 3. In FIG. 3, the communication process sections 11 to 13 decide whether the communication parameters D11 to D13 are newly set or changed (step S101). When the communication parameters D11 to D13 are newly set or changed (YES at step S101), the baud rates D21 to D23 are extracted from the communication parameters D11 to D13 (step S102), and the baud rates D21 to D23 are multiplied by a communication regulated time which is a timer time used in timer control for transmission/reception. On the basis of the multiplication results, MTU lengths are calculated (step S103). The MTU lengths are set as the MTU lengths D31 to D33 (step S104) to finish this process. On the other hand, when the communication parameters D11 to D13 are not newly set or changed (NO at step S101), this process is immediately finished. When the MTU lengths D31 to D33 are set, the MTU lengths D31 to D33 are kept. Thereafter, the communication control sections 21 to 23 perform transmission/reception control of packets by using the MTU lengths D31 to D33 set as explained above.

Figure 4:
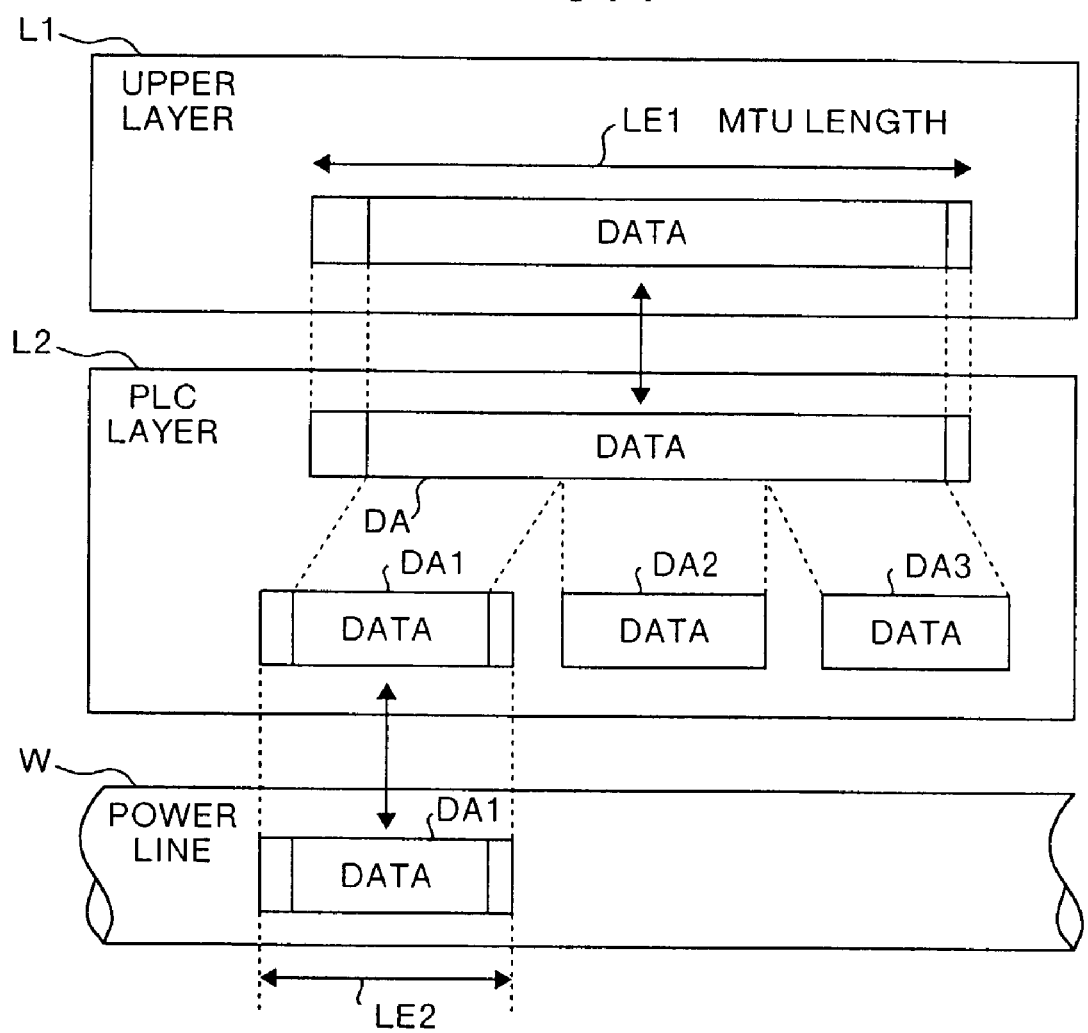
FIG. 4 is a diagram which shows the layer configuration of the nodes shown in FIG. 1 and a relationship between reception and transmission of packets.

How the data is transmitted or received by using the set MTU length will be explained below with reference to FIG. 4. The communication layers of the nodes N1 to N3 are roughly constituted by an upper layer L1 which is an application or the like and a PLC (Power Line Communication) layer L2 serving as a lower layer. The upper layer L1 is fixedly set to an MTU length LE1 having 1514 bytes. Therefore, the PLC layer L2 gives data to the upper layer L1 in units of packets each having the MTU length LE1.

In general, in a CSMA/CD layer or the like corresponding to the PLC layer L2, the packet having the MTU length LE1 is directly transmitted on the power line W. However, in the PLC layer L2, in order to transmit a packet based on a constant communication regulated time, the MTU lengths D31 to D33 corresponding to the baud rates D21 to D23 are calculated, data DA in the packet given from the upper layer L1 and having the MTU length LE1 is divided into data DA1 to DA3 to generate a packet having an MTU length LE2 which serves as the MTU lengths D31 to D33 to transmit the packet on the power line W. When the packet having the MTU length LE2 is generated, a header and a trailer are added to each of the data DA1 to DA3. When a packet is given from the PLC layer L2 to the upper layer L1, a header and a trailer are given to the data DA.

Figure 5:
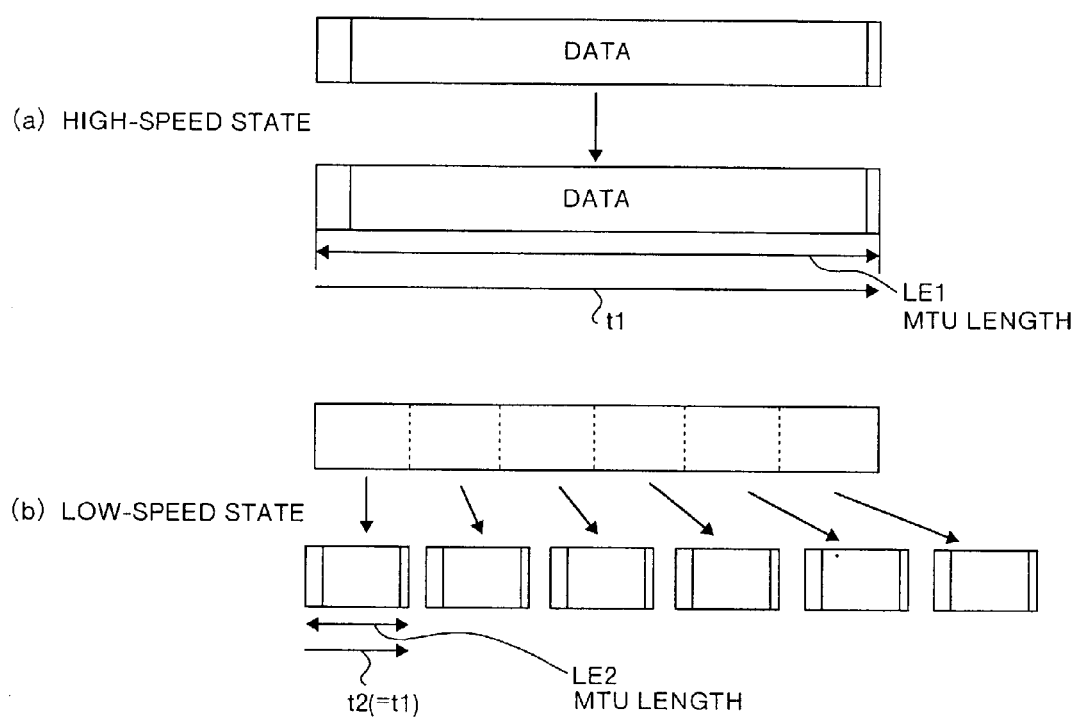
FIG. 5 is a diagram which shows a relationship between the MTU length and the transmission time shown in FIG. 1 with reference to the MTU length.
Figure 6:
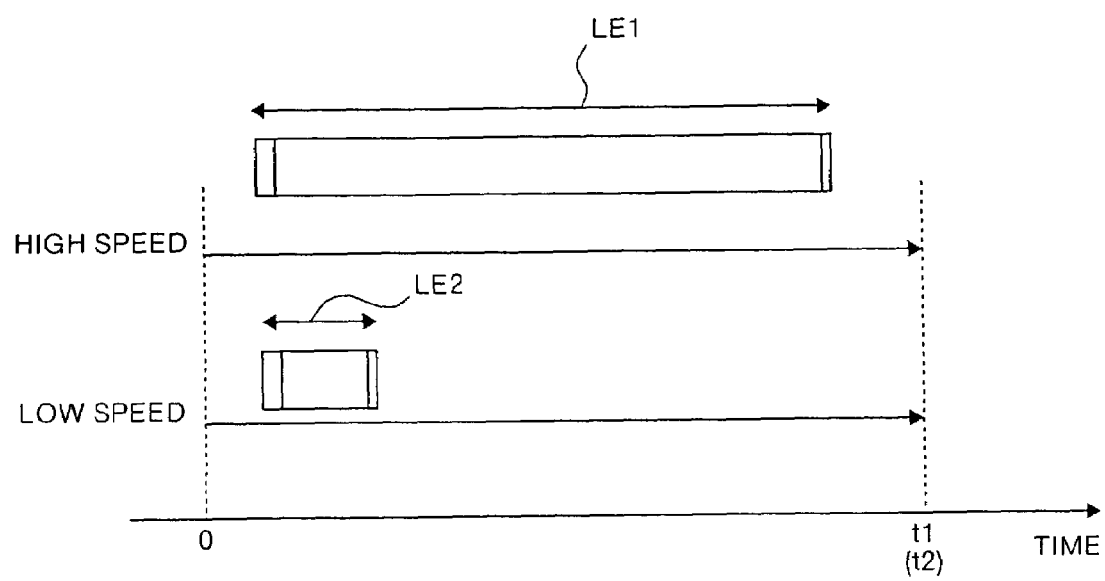
FIG. 6 is a diagram which shows a relationship between the MTU length and the transmission time shown in FIG. 1 with reference to time.

Therefore, as shown in FIG. 5, when a high baud rate is set, a packet having the large MTU length LE1 is transmitted on the power line W. When a low baud rate is set, a packet having a small MTU length LE2 is transmitted on the power line W. In this instance, since the MTU lengths LE1 and LE2 are set so that communication regulated times are equal to each other, transmission times t1 and t2 of respective packets are equal to each other as shown in FIG. 6. As a result, a time for occupying the power line W during performance of low-speed communication between the nodes N1 and N2 is equal to a time for occupying the power line W during performance of high-speed communication between the nodes N2 and N3.

Figure 7:
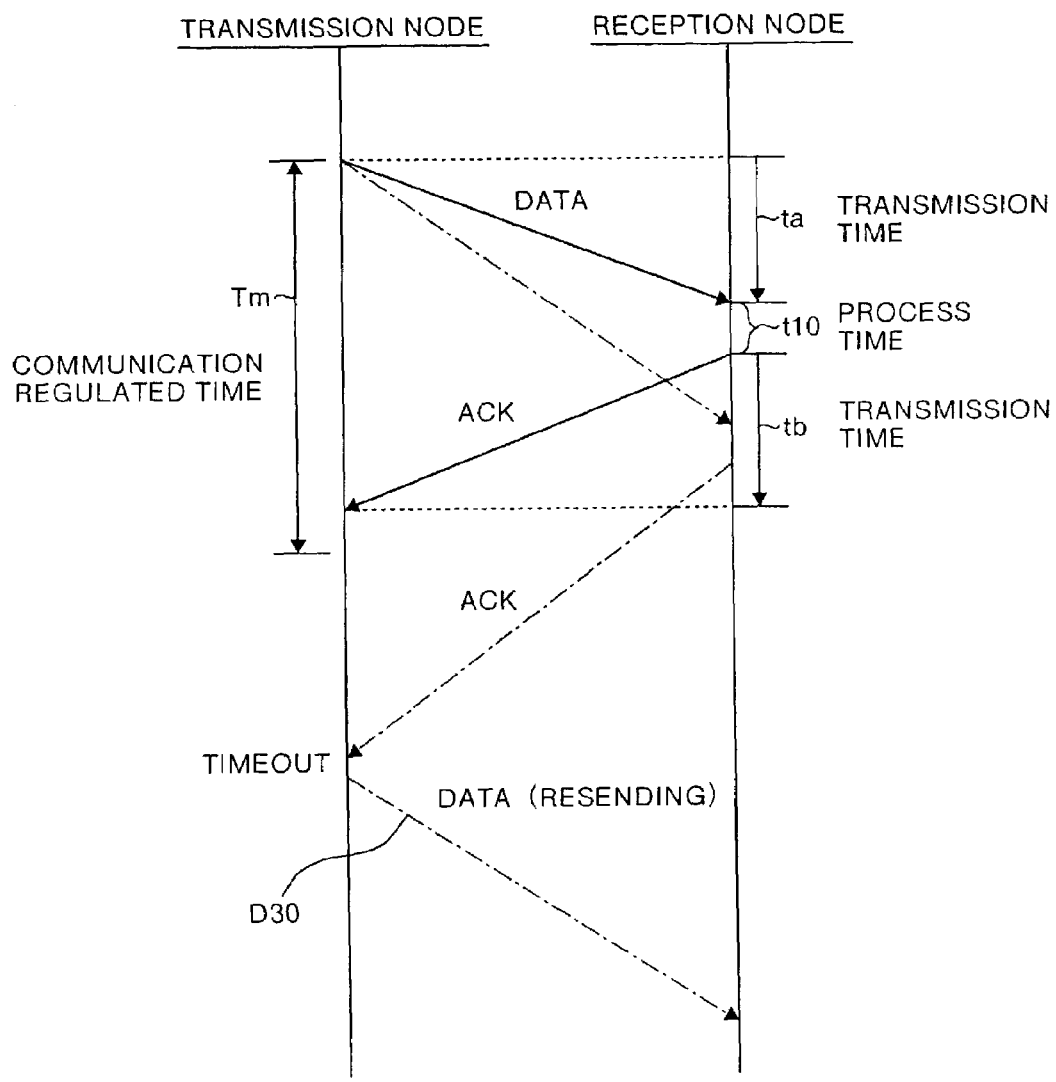
FIG. 7 is a diagram which shows an inter-node communication sequence in the communication system shown in FIG. 1.

Further, regardless of low-speed communication and high-speed communication, the times for occupying the power line W are equal to each other. For this reason, a communication regulated time Tm from when a packet is transmitted to when an acknowledgement packet of the packet is received is constant. As a result, as shown in FIG. 7, regardless of the low-speed communication and the high-speed communication, a time for a series of data transmission procedures (one transaction) between the nodes N1 to N3 is always shorter than the communication regulated time Tm. Unlike a conventional example in which packets having equal MTU lengths are transmitted at different baud rates, a packet D30 is prevented from its being resent, and efficient communication is performed, and communication having time-critical properties can be maintained.

The communication regulated time Tm is a timer time used to check whether a transmitted packet is distributed or not based on an obtained acknowledgement (ACK) of distribution of the transmitted packet. When the timer time exceeds the communication regulated time Tm (timeout), the same packet is resent. The communication regulated time Tm is a time obtained such that a predetermined margin is added to a total time of a transmission time ta of a packet transmitted from a transmission node, a process time t10 of a reception node, and a transmission time tb of an ACK packet transmitted from the reception node. In the first embodiment, equal communication regulated times Tm are set for all the nodes N1 to N3. The values of the MTU lengths D31 to D33 of packets transmitted on the power line W may be set so that the packet transmission times are almost equal to each other when the packets are transmitted on the power line W by using the MTU lengths D31 to D33.

In the first embodiment, the MTU lengths D31 to D33 are set such that data are transmitted and received within the constant communication regulated time Tm for the set baud rates D21 to D23, and the packets having the MTU lengths are transmitted on the power line W. For this reason, regardless of low-speed communication and high-speed communication, times for occupying the power line W by communications between the nodes N1 to N3 are equal to each other, and the low-speed communication does not adversely affect the high-speed communication. As a result, communication of voice or motion images having time-critical properties can be always secured. In addition, since the transactions between the nodes N1 to N3 are made within the equal communication regulated times Tm, efficient communication can be performed.

Second Embodiment:

A second embodiment of this invention will be explained below. In the first embodiment explained above, MTU lengths are set so that one transaction is finished within a constant communication regulated time to prevent low-speed communication from adversely affecting high-speed communication. However, in the second embodiment, high-speed communication having a large capacity and time-critical properties can be reliably secured.

Figure 8:
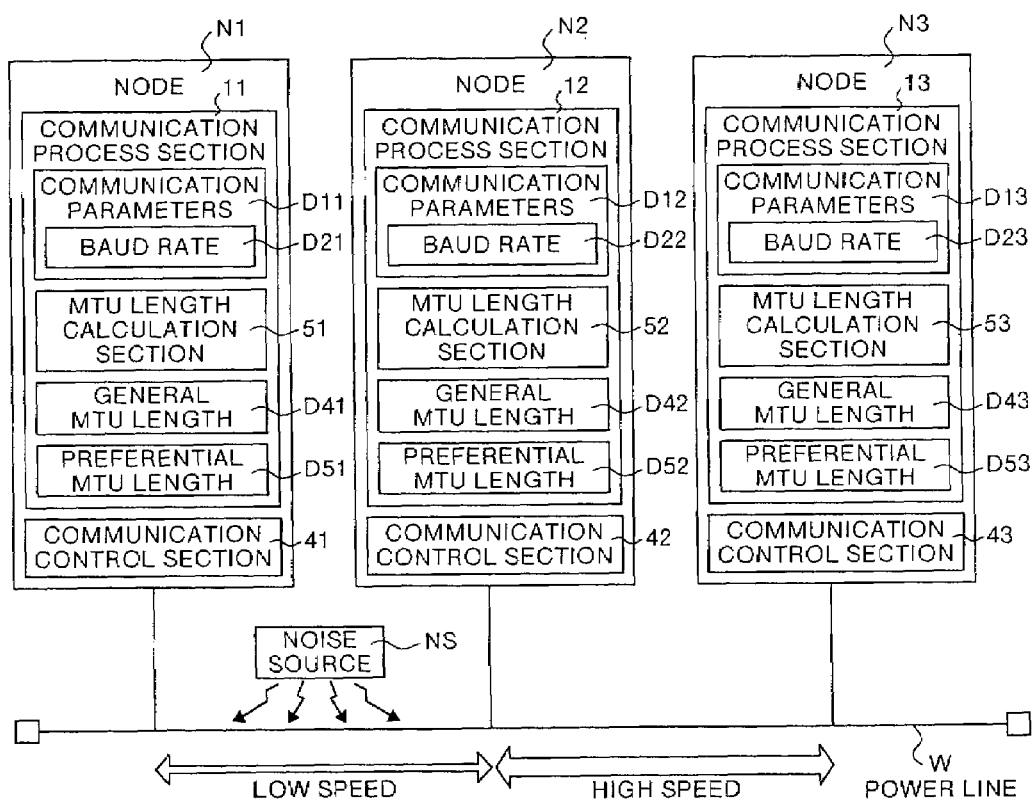
FIG. 8 is a diagram which shows a schematic configuration of a communication system according to a second embodiment of the invention.

FIG. 8 is a diagram which shows a schematic configuration of a communication system according to the second embodiment of the invention. In FIG. 8, this communication system has MTU length calculation sections 51 to 53 corresponding to the MTU length calculation sections 31 to 33. The MTU length calculation sections 51 to 53 use packets in the high-speed communication having a large capacity and time-critical properties as preferential packets to calculate preferential MTU lengths D51 to D53 that are longer than the MTU lengths of other general packets. In this instance, the MTU length calculation sections 51 to 53 calculate the preferential MTU lengths by multiplying baud rates D21 to D23 by a communication regulated time (preferential communication regulated time) longer than a communication regulated time (general communication regulated time) of the general packet. General MTU lengths D41 to D43 set for the general packets are set in the same manner as those of the MTU lengths D31 to D33 explained in the first embodiment.

Communication control sections 41 to 43 classify packets into preferential packets and general packets, and transmit these packets as those having the respectively set preferential MTU lengths D51 to D53 and the general MTU lengths D41 to D43 on a power line W. The remaining configuration is the same as that of the first embodiment. The same reference numerals as in the first embodiment denote the same parts in the second embodiment.

Figure 9:
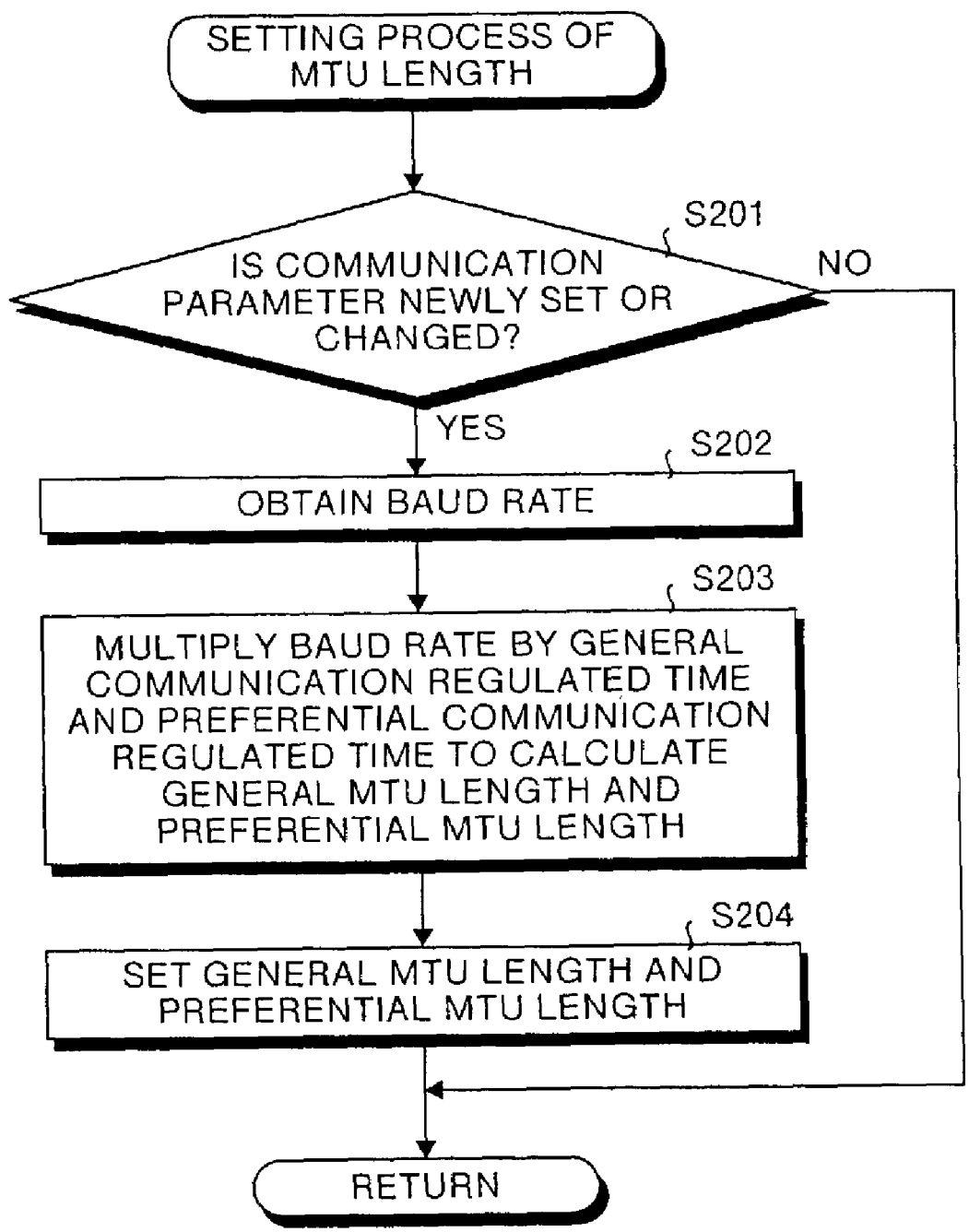
FIG. 9 is a flow chart which shows how the communication process unit shown in FIG. 8 sets an MTU length.

How the communication process sections 11 to 13 shown in FIG. 8 set the MTU lengths will be explained below with reference to the flow chart shown in FIG. 9. In FIG. 9, the communication process sections 11 to 13 decide whether the communication parameters D11 to D13 are newly set or changed (step S201). When the communication parameters D11 to D13 are newly set or changed (YES at step S201), baud rates D21 to D23 are extracted from the communication parameters D11 to D13 (step S202).

The baud rates D21 to D23 are multiplied by a preferential communication regulated time which is a timer time used in timer control for transmission/reception of preferential packets. On the basis of the preferential multiplication results, preferential MTU lengths are calculated. The baud rates D21 to D23 are multiplied by a general communication regulated time which is a timer time used in timer control for transmission/reception of packets other than the preferential packets. On the basis of the multiplication results, general MTU lengths are calculated (step S203). The preferential MTU lengths and the general MTU lengths are set as the preferential MTU lengths D51 to D53 and the general MTU lengths D41 to D43 (step S204) to finish this process. On the other hand, when the communication parameters D11 to D13 are not newly set or changed (NO at step S201), this process is immediately finished. When the MTU lengths D51 to D53 and the general MTU lengths D41 to D43 have been set, the preferential MTU lengths D51 to D53 and the general MTU lengths D41 to D43 are maintained. Thereafter, the communication control sections 21 to 23 perform transmission/reception control of packets by using the set preferential MTU lengths D51 to D53 and the set general MTU lengths D41 to D43.

Figure 10:
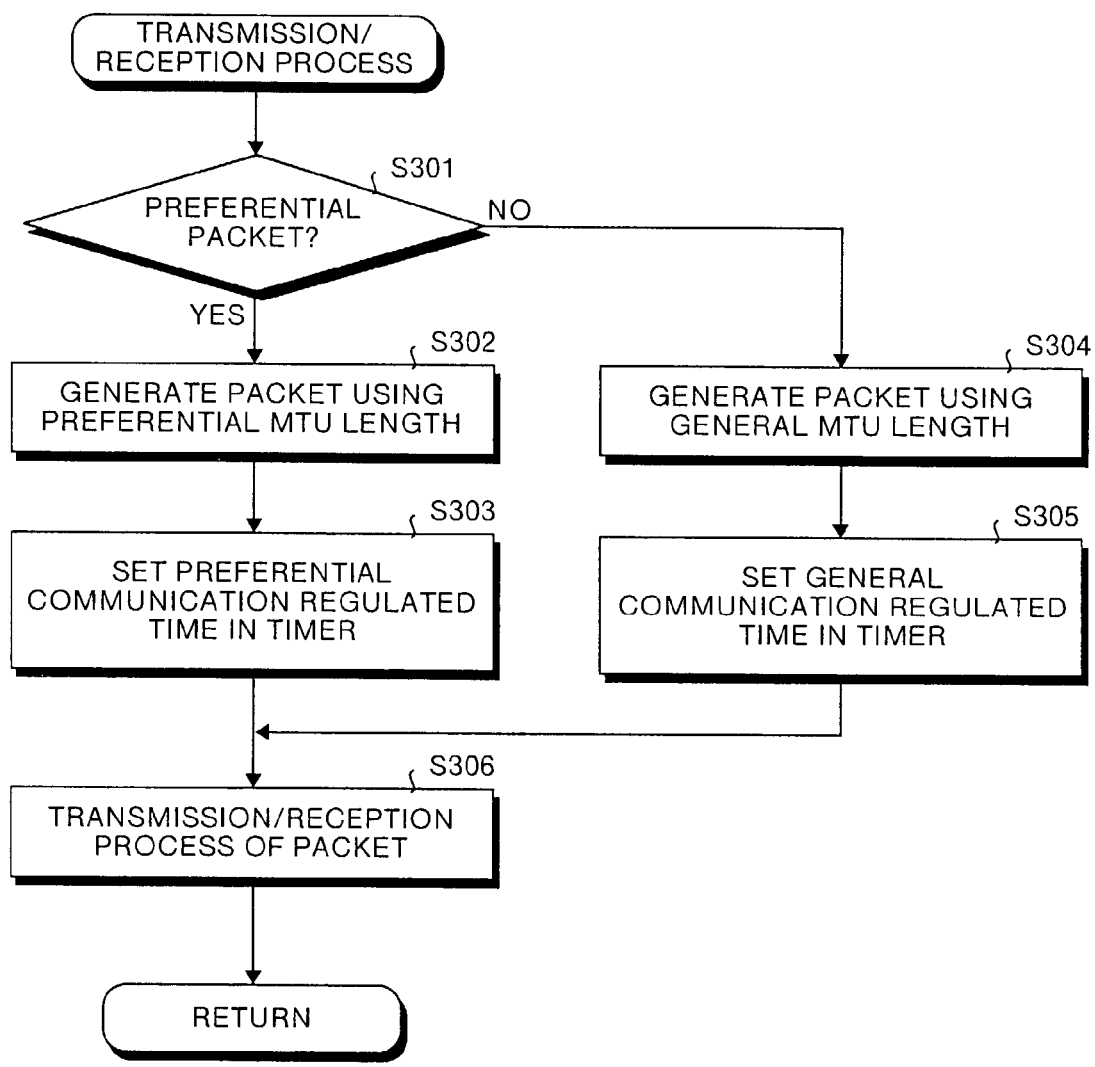
FIG. 10 is a flow chart which shows a transmission/reception procedure by the communication control unit shown in FIG. 8.

In addition, a transmission/reception process of packets by the communication control sections 21 to 23 will be explained below with reference to a flow chart shown in FIG. 10. In FIG. 10, the communication control sections 21 to 23 decide whether packets to be transmitted are preferential packets or not (step S301). When the packets are the preferential packets (YES at step S301), the preferential packets having the set preferential MTU lengths D51 to D53 are generated (step S302), a preferential communication regulated time is set in the timer (step S303), a transmission/reception process of the preferential packets is performed (step S306), and this process is On the other hand, when the packets are not preferential packets, i.e., when the packets are general packets (NO at step S301), general packets having the set general MTU lengths D41 to D43 are generated (step S304), a general communication regulated time is set in the timer (step S305), a transmission/reception process of the general packets is performed (step S306), and this process is finished.

Figure 11:
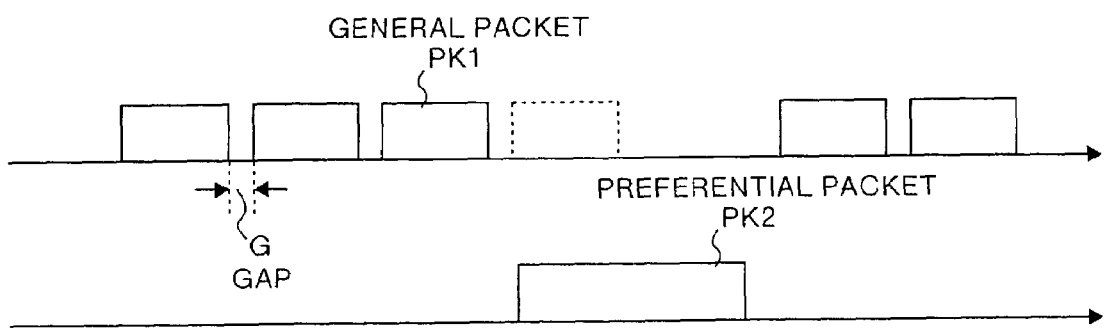
FIG. 11 is a diagram which shows a relationship between a communication packet based on the communication system shown in FIG. 8 and a general packet.

In this manner, as shown in FIG. 11, since a preferential packet PK2 having an MTU length larger than the MTU length of a general packet PK1 is transmitted on the power line W, high-speed communication having a large capacity and time-critical properties can be maintained. In particular, since the MTU length of the general packet PK1 is smaller than the MTU length of the preferential packet PK2, a cycle in which a gap G as an idle period between the packets Pk2 arrives is elongated, the time-critical properties of the preferential packet PK2 can be more properly maintained.

In the second embodiment, the preferential communication regulated time and the general communication regulated time which are different from each other are set for a preferential packet and a general packet, respectively, and the MTU length of the preferential packet is set to be larger than the MTU length of the general packet on the basis of the preferential communication regulated time, the general communication regulated time, and the baud rates. Therefore, as in the first embodiment, the influence of the low-speed communication on the high-speed communication can be eliminated, and the high-speed communication having a large capacity and time-critical properties can be reliably secured.

Third Embodiment:

A third embodiment of the invention will be explained below. In the third embodiment, when an MTU length set in the first embodiment or second embodiment is a predetermined value or less, communication between nodes in which the MTU length is set or a relay communication are stopped in consideration of the efficiency of communication.

Figure 12:
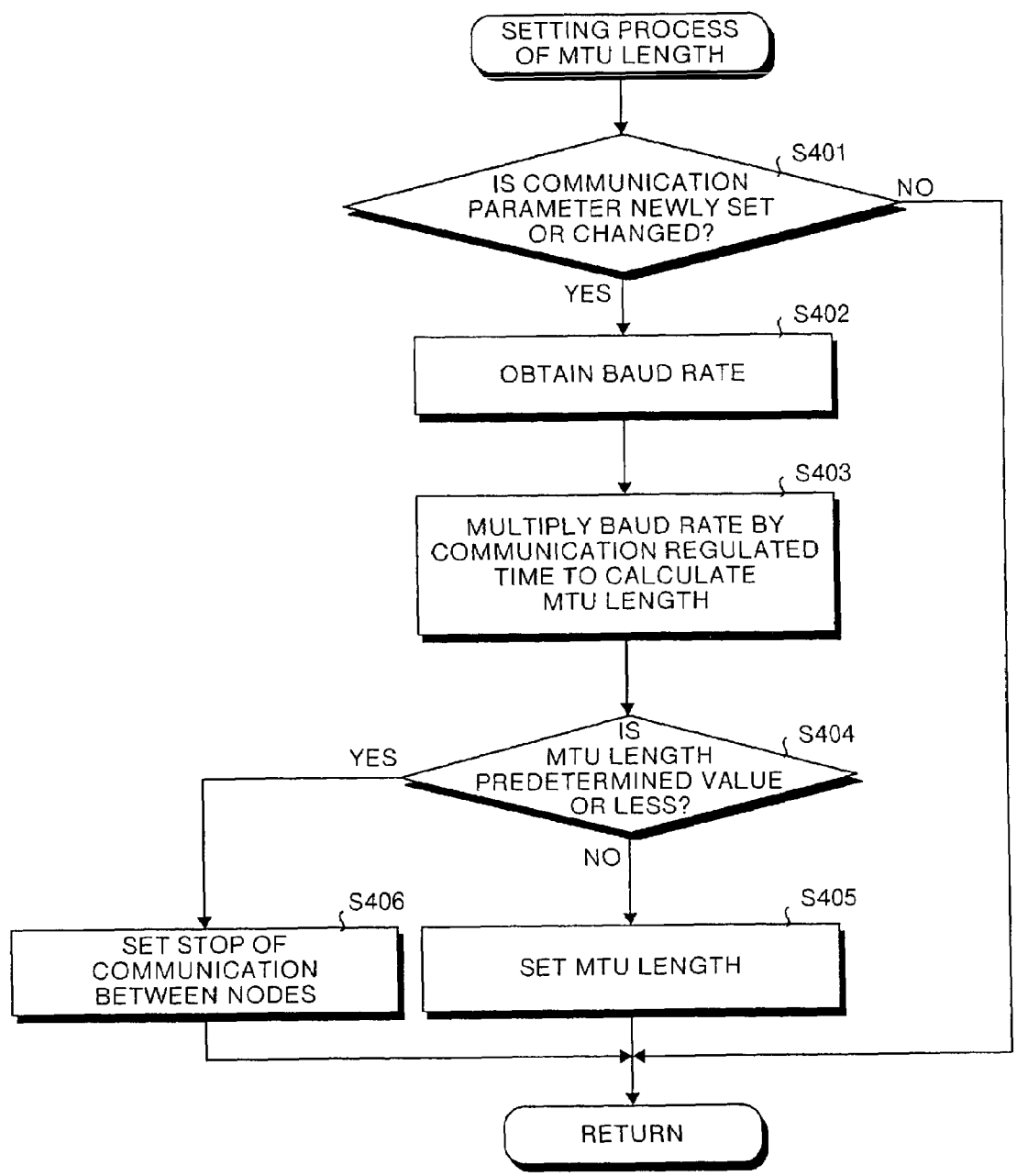
FIG. 12 is a flow chart which shows how the communication process unit according to a third embodiment of the invention sets an MTU length.

The configuration of the third embodiment is the same as that of each of the first and second embodiments. However, the respective process controls of the communication process sections 11 to 13 or the communication control sections 21 to 23 and 41 to 43 are different. How the communication process sections 11 to 13 set the MTU lengths will be explained below with reference to a flowchart shown in FIG. 12. Although the procedure will be explained below with reference to the first embodiment, the procedure can also be applied with respect to the second embodiment. In FIG. 12, the communication process sections 11 to 13, as at steps S101 to S103, decide whether the communication parameters D11 to D13 are newly set or changed (step S401). When the communication parameters D11 to D13 are newly set or changed (YES at step S401), baud rates D21 to D23 are extracted from the communication parameters D11 to D13 (step S402). The baud rates D21 to D23 are multiplied by a communication regulated time which is a timer time used in timer control for transmission/reception. On the basis of the multiplication results, MTU lengths are calculated (step S403), and the MTU lengths are set as MTU lengths D31 to D33 (step S404).

Thereafter, the communication process sections 11 to 13 decide whether the set MTU lengths are a predetermined value or less (step S404). The predetermined value is an MTU length at which a quantity of transmittable data is almost zero when a header and a trailer are added to the data. When the set MTU length is the predetermined value or less (YES at step S404), a setting for stopping communication between nodes in which the MTU length is set is performed (step S406), this process is finished. When the set MTU length is not the predetermined value or less (NO at step S404), the MTU length is set (step S405), this process is finished. On the other hand, when the communication parameters D11 to D13 are not newly set or changed (NO at step S401), this process is immediately finished. When the MTU lengths D31 to D33 have been set, the MTU lengths D31 to D33 are maintained. Thereafter, the communication control sections 21 to 23 perform transmission/reception control of packets by using the set MTU lengths D31 to D33. When the stop of communication is set, the communication control sections 21 to 23 stop the communication.

In the third embodiment, when the set MTU length is the predetermined value or less, a setting for stopping communication between nodes is performed. The invention is not limited to the embodiment, the following configuration may be employed. That is, even though the set MTU length is the predetermined value or less, the MTU length is set in the communication process sections 11 to 13, and it is decided whether the MTU length is the predetermined value or less when the communication control sections 21 to 23 actually transmit and receive packets. When the MTU length is the predetermined value or less, control for stopping communication is performed.

In the third embodiment, a transmission state in which inter-node communication is performed is explained. However, this invention is not limited to the embodiment, and can also be applied when a relay process is performed. More specifically, at the time of transmitting a packet to be relayed, if an MTU length between nodes is set to be a predetermined value or less or is the predetermined value or less, relay transmission of the packet to be relayed is stopped.

In the third embodiment, when the set MTU length is the predetermined value or less, transmission or relay transmission is stopped. Therefore, efficient communication can be realized.

As explained above, according to this invention, the calculation units of the nodes calculate, on the basis of transmission rates of communication parameters set based on negotiation results with other nodes, the maximum packet lengths of packets which are transmitted to destination nodes for equal transmission times. The transmission process unit divides data to be transmitted to a destination node into packets having the maximum packet length that is calculated by the calculation unit for the destination node, and transmits the packets, and thereby occupation times of packet transmission on the transmission medium are always equal to each other. Therefore, the influence of the low-speed inter-node communication on the high-speed inter-node communication can be eliminated, and communication having time-critical properties can be reliably secured advantageously.

According to the next invention, the calculation unit calculates the maximum packet lengths based on a value such that a regulated time in which transmission times of packets for destination nodes are equal to each other is multiplied by a transmission rate of communication parameters, so that transmission of the packets is always finished within the regulated time. Therefore, the influence of the low-speed inter-node communication on the high-speed inter-node communication can be eliminated, and efficient communication can be performed advantageously because the packets are prevented from being resent.

According to the next invention, the calculation unit calculates the first maximum packet length based on the value such that the first regulated time in which transmission times of preferential packets for the destination nodes are equal to each other is multiplied by the transmission rate and calculates the second maximum packet length based on the value such that the second regulated time in which transmission times of packets other than the preferential packets for the destination nodes are equal to each other is multiplied by the transmission rate. The transmission process unit divides, when data to be transmitted to the destination nodes is data of the preferential packets, the data into packets each having the first maximum packet length to transmit the packets, and divides, when the data to be transmitted to the destination nodes is data of packets other than the preferential packets, the data into packets each having the second maximum packet length to transmit the packets, so that the maximum packet length of the preferential packets is set to be longer than the maximum packet length of the packets other than the preferential packets. Therefore, high-speed communication having a large capacity and time-critical properties can be reliably maintained advantageously.

According to the next invention, the regulated time, the first regulated time, or the second regulated time is a maximum waiting time for loopback which is set in a timer for transmission/reception control and is a time from when a packet is transmitted to a destination to when an acknowledgement packet corresponding to the packet is received, so that one transaction is reliably finished within the maximum waiting time. Therefore, a number of resending times of packets is reduced, and efficient communication can be performed advantageously.

According to the next invention, the transmission process unit stops transmission of a packet to the destination node when the maximum packet length, the first maximum packet length, or the second maximum packet length is not larger than a predetermined length. Therefore, transmission of packets whose data transmission efficiency is substantially low is prevented from being performed, and efficient communication can be realized advantageously.

According to the next invention, at the time of performing a relay transmission of a packet, the transmission process unit stops relay transmission of the packet subjected to the relay process when the maximum packet length, the first maximum packet length, or the second maximum packet length is not larger than a predetermined length. Therefore, relay transmission of packets whose data transmission efficiency is substantially low is prevented from being performed, and efficient communication can be realized advantageously.

According to the next invention, in the calculation step, the maximum packet length of packets is calculated for each node so that transmission times of the packets between the nodes are equal to each other, based on a transmission rate out of communication parameters that are set according to results of negotiation with other nodes. In the transmission process step, data to be transmitted to the destination node is divided into respective data based on the maximum packet length that is calculated in the calculation step for the destination node, and the data is transmitted. Therefore, the influence of the low-speed inter-node communication on the high-speed inter-node communication can be eliminated, and communication having time-critical properties can be reliably secured advantageously.

According to the next invention, in the calculation step, the maximum packet length is calculated based on the value such that the regulated time in which transmission times of packets for destination nodes are equal to each other is multiplied by the transmission rate of communication parameters. Therefore, the influence of the low-speed inter-node communication on the high-speed inter-node communication can be eliminated, and efficient communication can be performed because the packets are prevented from being resent.

According to the next invention, in the calculation step, the first maximum packet length is calculated based on the value such that the first regulated time in which transmission times of preferential packets for the destination nodes are equal to each other is multiplied by the transmission rate, and the second maximum packet length is calculated based on the value such that the second regulated time in which transmission times of packets other than the preferential packets for the destination nodes are equal to each other is multiplied by the transmission rate. In the transmission process step, when data to be transmitted to the destination nodes is data of the preferential packets, the data is divided into packets each having the first maximum packet length to transmit the packets, and the data is divided into packets each having the second maximum packet length to transmit the packets when the data to be transmitted to the destination nodes is data of packets other than the preferential packets. That is, the maximum packet length of the preferential packets is set to be longer than the maximum packet length of the packets other than the preferential packets. Therefore, by using the preferential packets, high-speed communication having a large capacity and time-critical properties can be reliably maintained advantageously.

According to the next invention, the regulated time, the first regulated time, or the second regulated time is a maximum waiting time for loopback which is set in a timer for transmission/reception control and is a time from when a packet is transmitted to a destination to when an acknowledgement packet corresponding to the packet is received, so that one transaction is reliably finished within the maximum waiting time. Therefore, a number of resending times of packets can be reduced, and efficient communication can be performed advantageously.

According to the next invention, in the transmission process step, transmission of a packet to the destination node is stopped when the maximum packet length, the first maximum packet length, or the second maximum packet length is not larger than a predetermined length. Therefore, transmission of packets whose data transmission efficiency is substantially low is prevented from being performed, and efficient communication can be realized advantageously.

According to the next invention, at the time of performing a relay process of a packet in the transmission process step, relay transmission of the packet subjected to the relay process is stopped when the maximum packet length, the first maximum packet length, or the second maximum packet length is not larger than a predetermined length. Therefore, the relay transmission of packets whose data transmission efficiency is substantially low is prevented from being performed, and efficient communication can be realized advantageously.

INDUSTRIAL APPLICABILITY

As explained above, the communication system and the communication method according to the present invention are suitable for communication between nodes by using a transmission medium such as a power line that the communication qualities change depending on connection positions of a plurality of nodes connected to the same transmission medium or connection time zones thereof.

The invention claimed is:

1. A communication system for performing communication between nodes by using a transmission medium such that communication qualities change depending on connection positions of a plurality of nodes connected on the same transmission medium or on connection time zones thereof, wherein each of the nodes comprises:

a calculation unit which calculates maximum packet lengths of packets so that transmission times of the packets between nodes are equal to each other, based on a transmission rate out of communication parameters that are set according to results of negotiation with other nodes; and a transmission process unit which divides data to be transmitted to a destination node into packets having the maximum packet length that is calculated by the calculation unit for the destination node, and transmits the packets.

2. The communication system according to claim 1, wherein the calculation unit calculates the maximum packet length based on a value such that a regulated time in which transmission times of packets for the destination nodes are equal to each other is multiplied by the transmission rate.

3. The communication system according to claim 2, wherein the regulated time is a maximum waiting time for loopback which is set in a timer for transmission and reception control and is a time from when a packet is transmitted to a destination to when an acknowledgement packet corresponding to the packet is received.

4. The communication system according to claim 1, wherein
   the calculation unit calculates a first maximum packet length based on a value such that a first regulated time in which transmission times of preferential packets for the destination nodes are equal to each other is multiplied by the transmission rate, and calculates a second maximum packet length based on a value such that a second regulated time in which transmission times of packets other than the preferential packets for the destination nodes are equal to each other is multiplied by the transmission rate, and
   the transmission process unit divides data to be transmitted to the destination nodes into packets each having the first maximum packet length to transmit the packets when the data is data of the preferential packets, and divides data to be transmitted to the destination nodes into packets each having the second maximum packet length to transmit the packets when the data is data of packets other than the preferential packets.

5. The communication system according to claim 4, wherein the first regulated time or the second regulated time is a maximum waiting time for loopback which is set in a timer for transmission and reception control and is a time from when a packet is transmitted to a destination to when an acknowledgement packet corresponding to the packet is received.

6. The communication system according to claim 1, wherein the transmission process unit stops transmission of a packet to the destination node when the maximum packet length, the first maximum packet length, or the second maximum packet length is not larger than a predetermined length.

7. The communication system according to claim 1, wherein when a relay process of a packet is performed, the transmission process unit stops relay transmission of the packet that is subjected to the relay process when the maximum packet length, the first maximum packet length, or the second maximum packet length is not larger than a predetermined length.

8. A communication method of communication between nodes by using a transmission medium such that communication qualities change depending on connection positions of a plurality of nodes connected on the same transmission medium or connection time zones thereof, the communication method comprising:
   a calculation step of calculating maximum packet lengths of packets so that transmission times of the packets between the nodes are equal to each other, for each nodes, based on a transmission rate out of communication parameters that are set according to results of negotiation with other nodes; and
   a transmission process step of dividing data to be transmitted to a destination node into respective data based on the maximum packet length that is calculated in the calculation step for the destination node, and transmitting the divided data.

9. The communication method according to claim 8, wherein in the calculation step, the maximum packet length is calculated based on a value such that a regulated time in which transmission times of packets for the destination nodes are equal to each other is multiplied by the transmission rate.

10. The communication method according to claim 9, wherein the regulated time is a maximum waiting time for loopback which is set in a timer for transmission and reception control and is a time from when a packet is transmitted to a destination to when an acknowledgement packet corresponding to the packet is received.

11. The communication method according to claim 8, wherein in the calculation step, a first maximum packet length is calculated based on a value such that a first regulated time in which transmission times of preferential packets for the destination nodes are equal to each other is multiplied by the transmission rate, and a second maximum packet length is calculated based on a value such that a second regulated time in which transmission times of packets other than the preferential packets for the destination nodes are equal to each other is multiplied by the transmission rate, and
   in the transmission process step, data to be transmitted to the destination node is divided into packets each having the first maximum packet length to transmit the packets when the data is data of the preferential packets, and data to be transmitted to the destination node is divided into packets each having the second maximum packet length to transmit the packets when the data is data of packets other than the preferential packets.

12. The communication method according to claim 11, wherein the first regulated time or the second regulated time is a maximum waiting time for loopback which is set in a timer for transmission and reception control and is a time from when a packet is transmitted to a destination to when an acknowledgement packet corresponding to the packet is received.

13. The communication method according to claim 8, wherein in the transmission process step, transmission of a packet to the destination node is stopped when the maximum packet length, the first maximum packet length, or the second maximum packet length is not larger than a predetermined length.

14. The communication method according to claim 8, wherein at the time of performing a relay process of a packet in the transmission process step, relay transmission of the packet subjected to the relay process is stopped when the maximum packet length, the first maximum packet length, or the second maximum packet length is not larger than a predetermined length.

* * * * *